(12) United States Patent
Bihun

(10) Patent No.: US 7,096,239 B2
(45) Date of Patent: Aug. 22, 2006

(54) TRIGONOMETRY CALCULATOR

(76) Inventor: Stephen Bihun, 1072 Atlantic Ave., Rochester, NY (US) 14609

( * ) Notice: Subject to any disclaimer, the term of this patent is extended or adjusted under 35 U.S.C. 154(b) by 523 days.

(21) Appl. No.: 10/744,614

(22) Filed: Dec. 23, 2003

(65) Prior Publication Data

US 2005/0138093 A1    Jun. 23, 2005

(51) Int. Cl.
*G06F 15/00* (2006.01)
(52) U.S. Cl. .................................................. 708/200
(58) Field of Classification Search ................ 708/200, 708/160, 130
See application file for complete search history.

(56) References Cited

U.S. PATENT DOCUMENTS

| | | | |
|---|---|---|---|
| 4,659,231 A | * | 4/1987 | Barkouki ..................... 368/15 |
| 4,680,455 A | * | 7/1987 | Kuo ............................ 708/140 |
| 4,815,020 A | * | 3/1989 | Cormier ..................... 708/141 |
| 5,873,729 A | * | 2/1999 | Aghevli ..................... 434/211 |

OTHER PUBLICATIONS

1728 Software Systems, Trigonometry Calculators, 2000, http://www.1728.com/indextrg.htm.*
Eric W. Weisstein, "Triangle Properties", 1999, From MathWorld—A wolfram web resource at http://mathworld.wolfram.com/topics/triangleproperties.html, pp. 1-26.*

* cited by examiner

*Primary Examiner*—Anil Khatri
*Assistant Examiner*—Chat C. Do
(74) *Attorney, Agent, or Firm*—Brown & Michaels, PC

(57) ABSTRACT

A trigonometry calculator is programmed with four selectable calculations of unknown parameters of any plane triangle having three known parameters. The calculations accept known parameters of SIDE SIDE ANGLE, SIDE ANGLE SIDE, SIDE SIDE SIDE, and ANGLE ANGLE SIDE and from such inputs calculate unknown angles and sides. The calculator can also be programmed to make a series of calculations determining three unknown parameters for any plane triangle having three known parameters.

14 Claims, 2 Drawing Sheets

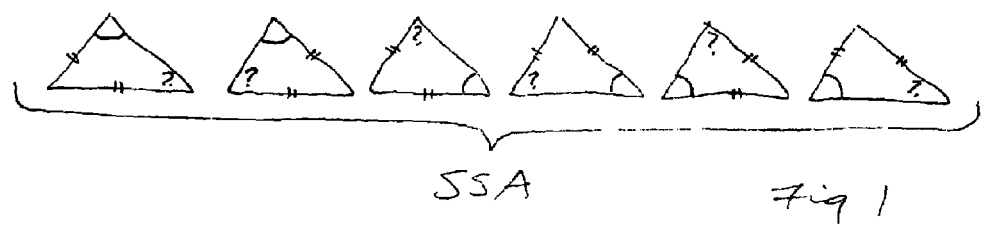
Fig 1 SSA
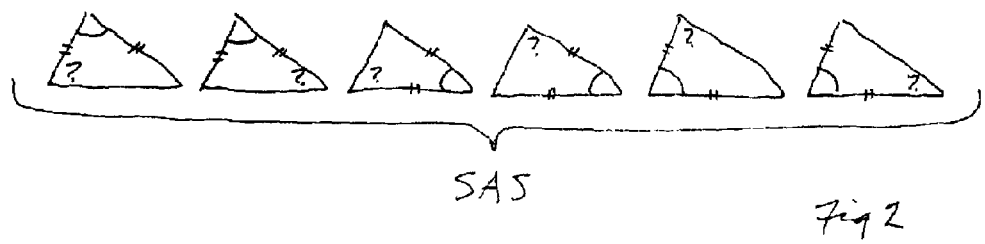
Fig 2 SAS
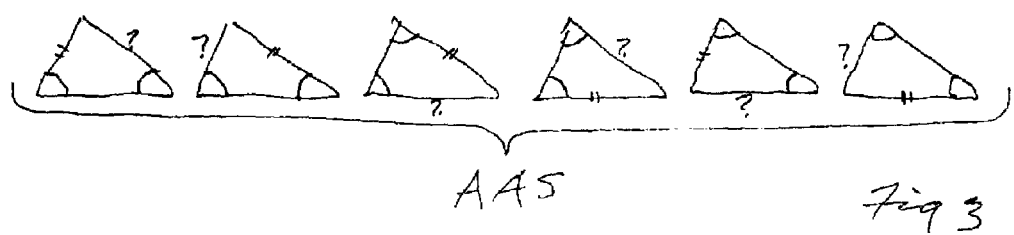
Fig 3 AAS
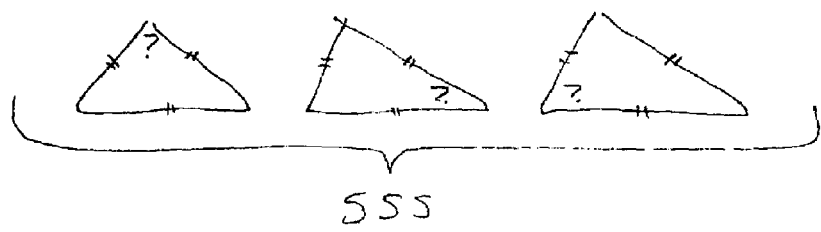
Fig 4 SSS

TRIGONOMETRY CALCULATOR

TECHNICAL FIELD

Calculators programmed to solve for unknown parameters of plane triangles when other parameters are known.

BACKGROUND

Trigonometry calculations are well established for plane triangles, and many calculators are programmed to assist with such calculations. Depending on which triangle parameters are known and which unknown parameter is to be solved, the calculations can be arduous and time consuming. This is especially true for plane triangles having no right angle. The mathematical knowledge required for triangular calculations, together with the necessity of keyboarding to make the required calculations work, is a problem addressed by this invention.

SUMMARY OF THE INVENTION

The invention proposes a simpler, faster, and more efficient way of calculating unknown parameters of plane triangles having three known parameters. The inventive calculating method allows even a person with no knowledge of underlying mathematical relationships to quickly calculate unknown triangle parameters.

To accomplish this, the invention proposes a way of programming a calculator to make fast and reliable calculations for any person who can follow simple prompts to enter three known triangle parameters. The invention also aims to accomplish this without requiring any understanding of mathematical relationships between angles and sides of triangles and yet satisfying needs for accurate answers derived from simply inputting known parameters of a given triangle.

Calculators to accomplish the inventive calculations can be either dedicated to triangle work, or can be general-purpose calculators having triangle calculation capability. Calculators can also be programmed according to the invention so that beginning with any three known parameters of any plane triangle, a calculator can determine values for the three remaining parameters. This allows a person having three triangle parameters available to input those into a calculator which can then determine all the remaining parameters.

DRAWINGS

FIG. 1 is schematic diagrams of triangles having three known parameters in the form of side, side, and angle for which a second angle can be determined.

FIG. 2 is schematic diagrams of triangles having three known parameters in the form of side, angle, side for which an unknown angle can be determined.

FIG. 3 is schematic diagrams of triangles having three known parameters in the form of angle, angle, side for which an unknown side can be determined.

FIG. 4 is schematic diagrams of triangles having three known parameters in the form of side, side, side for which an unknown angle can be determined.

DETAILED DESCRIPTION

Figure 5:
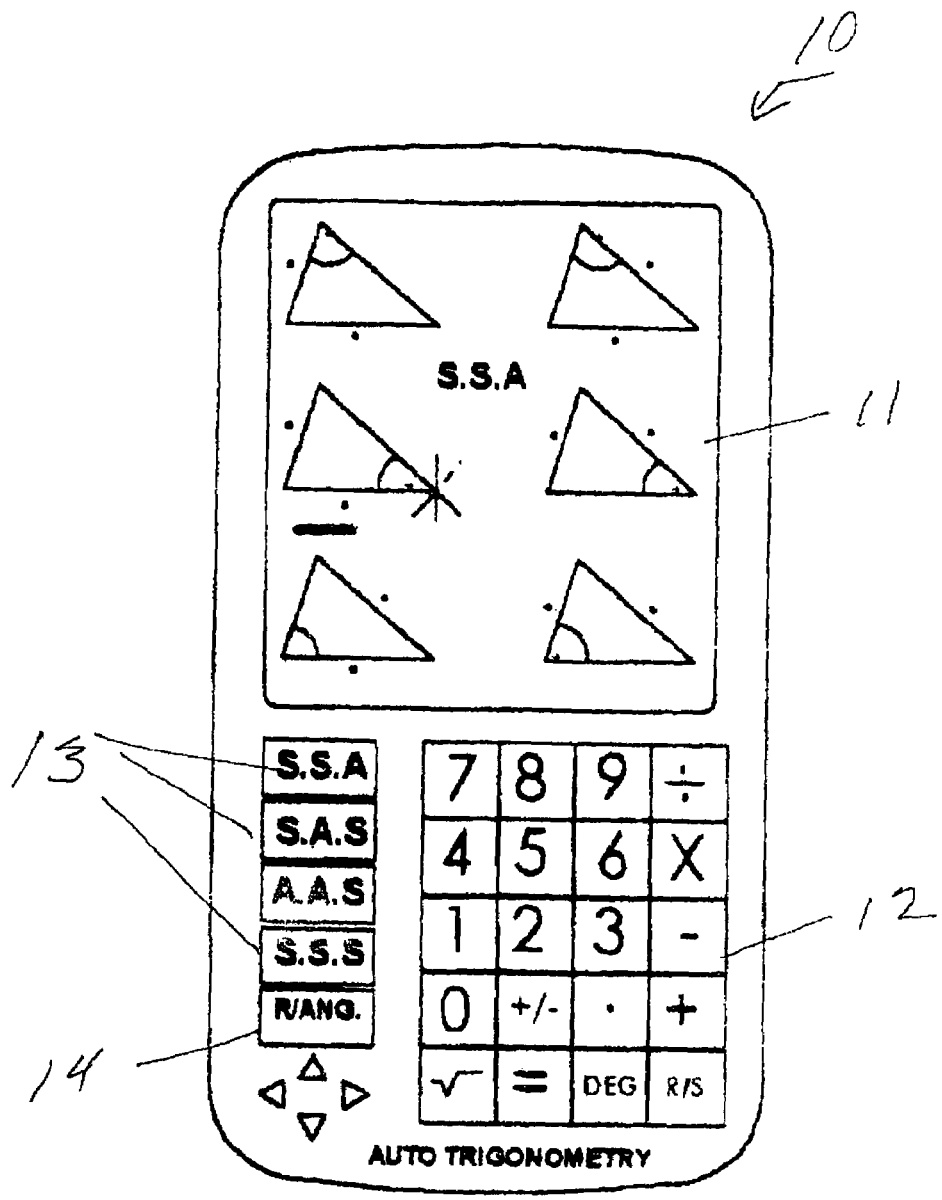
FIG. 5 is a schematic view of a calculator programmable according to the invention to solve for the unknown parameter indicated in FIGS. 1–4.

The invention recognizes that four simple calculations are sufficient to solve for unknown parameters of any plane triangle having three known parameters. The four different calculations are necessary because the three known parameters can come in four different combinations, as illustrated in FIGS. 1–4. There, the four calculations can be seen to involve side, side, and angle (SSA), side, angle, side (SAS), angle, angle, side (AAS), and side, side, side (SSS). These four calculations are adequate to determine an unknown parameter of any plane triangle having three known parameters.

The known parameter combinations suitable for the SSA calculation of FIG. 1 are two known sides (indicated by double slash marks) and a known angle (indicated by an arc) opposite one of the known sides, with the other known side being opposite an unknown angle to be calculated as indicated by question marks.

The SAS combination of three known parameters, as shown in FIG. 2, involves two known sides (indicated by double slash marks) adjacent or straddling a known angle (indicated by an arc) to determine an unknown angle as indicated by the question marks.

The AAS combination of known triangle parameters as shown in FIG. 3, involves two known angles (indicated by arcs) and a known side (indicated by double slash marks) opposite one of the known angles to determine an unknown side (indicated by question marks) opposite one of the known angles. If the side that is known happens to be between the two known angles, then the third angle can be calculated by subtracting the two known angles from 180° so that the unknown side to be determined is opposite a known angle.

The SSS calculation can be used to determine an unknown angle indicated by question marks in the FIG. 4 schematics showing triangles with three known sides (indicated by double slash marks).

The four calculations corresponding respectively to FIGS. 1–4 are all that is needed for solving unknown parameters of plane triangles having the indicated known parameters. This covers every plane triangle, whether including a right angle or not, and leaves no plane triangle that is unsolvable.

The four calculations, as shown and explained above, are alternatively selectable based upon a particular combination of known angles or sides presented by a triangle having unknown parameters to be calculated. The selection can be made by calculator keyboard keys, either directly or via interaction with a visible display. The way the calculations work is programmed into the calculator, as explained below, and does not require operator involvement in the mathematics employed. The selections of the correct calculation to be applied to a particular triangle is made simple and ergonomic and intuitively self-evident to persons whose awareness of triangle problems is in terms of known sides and angles. The inputting to the calculator of the known parameters, as also explained below, proceeds on the basis of the known sides and angles, without requiring any operator knowledge of the mathematics to be applied. This makes the calculations work simply and easily, especially for the millions of people who are not adept at trigonometry functions.

A calculator or computerized calculator programmed according to the invention preferably includes a display and a keyboard or other interface usable by an operator. The display can visually present to the user the four available calculations, such as illustrated in FIGS. 1–4, or some abbreviation of such illustrations. The keyboard can also include keys dedicated to SSA, SAS, AAS, and SSS for use by an operator in selecting a calculation suitable to the known parameters of a particular triangle. Alternatively, keyboard keys can be programmed to serve as selectors of SSA, SAS, AAS, and SSS calculations. Moreover, a calculator display can offer selectable choices between the four calculations so that selection of the correct calculation can be made visually via the calculator keyboard interface. For computerized calculators, calculation selection can be made by a movable icon.

After selecting one of the four calculations suitable for determining an unknown parameter of a particular triangle having three known parameters, what remains is to input to the calculator the known parameters so that the calculation can be done and the solution displayed. The inputting of the known parameters is preferably done via visually displayed prompts that can be followed by an operator.

The display 11 of calculator 10 of FIG. 5 illustrates whichever of the four alternative calculations has been selected by pressing one of the keys 13 on keyboard 12 to choose the calculation that fits a particular triangle. The calculation selection can also be made visually from a display illustrating the four possible calculation choices. Calculator 10 thus illustrates only one of many possibilities for a calculator, or a computerized calculator, programmed according to the invention.

Following the selection of one of the four calculations, the display can illustrate the possibilities available within the selected calculation. This can be done by the display showing one of the illustrations of FIGS. 1–4 respectively, or by reducing these illustrations to display of a single triangle on which the prompts can be shown. The display illustrated in FIG. 5 shows six triangle possibilities for the SSA calculation, but if a display is too small to conveniently illustrate six possibilities, these can be reduced to two possibilities at a time that can be changed by scrolling the display from a keyboard input. The triangles shown in display 11 are intended to help the user identify a particular arrangement of known parameters for input so that a calculation can proceed. This process can be further aided by adding illustrations of right triangles that can help a user visually identify the correct arrangement of known parameters. This can be done by using right angle key 14.

Once the correct display is illuminated, a blinking symbol can be used as a prompt, and in response to this, an operator can input, ordinarily via a keyboard, the known parameter indicated by the blinking prompt signal. When a parameter is entered, the calculator is preferably programmed to move the blinking prompt signal to the next known parameter, which the operator then enters via the interface. This is repeated until all three known parameters are entered, at which point the calculator makes the requested calculation either automatically, or by keyboard request. This solves for the unknown parameter, and the calculator is programmed to display the result for the operator.

Display 11, as illustrated in FIG. 5, is drawn from FIG. 1. Respectively similar displays can be drawn from FIGS. 2 and 3, once an operator has respectively selected SAS or AAS keys 13. The numbers of triangular options shown in a display depend both on the size of the available display, and whether displays are included for triangles with right angles. A total of nine displays are possible for the SSA, SAS, and AAS calculations. Many different options and arrangements are possible, as is generally known in the calculator and computer arts.

Many different signals and prompts can be used to guide an operator in entering the known parameters into the calculator. For example, instead of the double slash marks to indicate known sides, single slash marks, asterisks, dots, or highlighted lines can be used, depending on the calculator technology available. The unknown parameter to be calculated, instead of being indicated by a question mark, could be shown by a gap at the apex of an unknown angle, a gap in an unknown line, or other possibilities within the skill of calculator designers.

Once a fourth parameter is calculated and becomes known for the selected triangle, the calculator can be programmed to then proceed, either automatically or by keyboard request, with calculations that are necessary to solve for any remaining unknown parameters. In this context, every triangle has three angles and three sides yielding six parameters. The calculations for SSA, SAS, and AAS lead to two known sides and two known angles from which a third angle can be calculated simply by subtracting the two known angles from 180°. An SSS calculation initially yields one known angle from the three known sides, and then the programming can rotate or move to a different combination of the three known sides to yield another known angle, and this can be repeated to determine a third known angle. This can be done automatically, or in response to pressing a key to request additional angles after a first unknown angle has been calculated.

To find an unknown side, as the final unknown parameter, the calculator can be programmed to determine the unknown side from a known side times a sine of the angle opposite the unknown side divided by a sine of the angle opposite the known side. This additional calculation can be programmed to display the unknown side solution in response to a Run/Stop (R/S) key, or some equivalent. A calculator can also be programmed to complete this additional calculation step and display the solution automatically. In every possible situation, the calculations programmed into the calculator can be used to determine any unknown parameters, once four parameters have become known, and this can be done without further operator input.

Programs for the four calculations corresponding to the situations illustrated in FIGS. 1–4 are as follows:

The program for the SSA calculation applies to a triangle having a known angle, a known side opposite the known angle, and a known side adjacent the known angle, for calculating an unknown angle opposite the known side adjacent, and the SSA calculation comprises applying a reverse sine to a ratio defined by a sine of the known angle multiplied by the side adjacent the known angle and divided by the side opposite the known angle.

The program for the SAS calculation applies to a triangle having a known angle and a known side adjacent the known angle and opposite an unknown angle to be calculated, in another known side adjacent the known angle, the SAS calculation comprises applying a negative reverse tangent to a ratio defined by a sine of the known angle multiplied by the side opposite the unknown angle and divided by the cosine of the known angle multiplied by the side opposite the unknown angle minus the other known side adjacent the known angle.

The program for the AAS calculation applies to a triangle having a known angle opposite a known side and another known angle opposite an unknown side to be calculated, the AAS calculation comprises multiplying a sine of the angle opposite the unknown side by the known side and dividing by a sine of the angle opposite the known side.

The program for the SSS calculation applies to a triangle having three known sides for calculating an unknown angle opposite one of the known sides, the SSS calculation comprises applying a reverse cosine to a ratio defined by a square of a side adjacent the unknown angle plus a square of another side adjacent the unknown angle, minus a square of the side opposite the unknown angle divided by two times the side adjacent the unknown angle times the other side adjacent the unknown angle.

The SSA algorithm determines an unknown angle of a plane triangle having three known parameters in the general form illustrated in FIG. 1. The known angle can be any one of the three angles of the triangle, and one of the known sides is opposite the known angle. The SSA algorithm determines another angle opposite the other known side, as indicated by the question mark in FIG. 1.

A person confronted with a triangle having a known angle, a known side opposite the known angle, and one other known side can use the SSA algorithm to determine the unknown angle opposite the known side. The known parameters for such a triangle can occur in many different arrangements of different corners of the triangle and different sides of the triangle, providing that one of the known sides is opposite a known angle.

The SAS algorithm determines an unknown angle of a triangle having two known sides and a known angle, as shown in FIG. 2. Here, neither known side is opposite the known angle, and instead, the known sides intersect at the known angle. The SAS algorithm solves for one of the other angles opposite one of the known sides. Again, the known parameters can be arranged in a variety of ways at different corners and sides of a triangle.

The AAS algorithm of FIG. 3, determines an unknown side opposite a known angle, when another side opposite another known angle is known. Several arrangements of known angles are possible for this situation, but the AAS algorithm does not solve for two angles with a known side between them. In such a situation, since two angles are known, the third angle is easily determined by adding together the two known angles and subtracting from 180°. This then gives a side to be determined opposite a known angle, with a known side opposite a known angle so that the AAS algorithm can work.

The SSS algorithm corresponding to FIG. 4 determines one of the angles, when all three sides are known, as shown in FIG. 3. Any one of the angles can be determined, providing the relationships between sides opposite and adjacent to the unknown angle are observed. For example, the SSS algorithm can determine a different one of the angles by subtracting the square of the side opposite the angle to be determined from the sum of the squares of the other two sides and dividing by two times the product of the other two sides and applying an inverse cosine.

Calculator 10, as shown in FIG. 5 with its display 11 and keyboard interface 12 illustrates one possible calculator embodiment programmed to facilitate trigonometric calculations. Many other calculator embodiments can practice the invention, including calculators with different display capabilities, different and expanded keyboards, and calculators capable of many other functions and calculations besides trigonometric ones.

The illustrated calculator 10 is programmed so that display 11 can display the illustrated arrangements of four triangles corresponding to the four algorithms, and algorithm keys 13 can select an algorithm suitable for determining an unknown parameter of a plane triangle having known parameters that fit the selected algorithm. Calculator 10 can be programmed to operate prompts in display 11 so that when a calculator is selected, the triangular image corresponding to that calculation can wink to guide an operator in the input of known parameters. For example, an arc or other symbol indicating a known angle can wink on and off until the operator inputs the known angle. Then a known side or another angle can wink until an operator inputs the corresponding known parameter. Once the three known parameters are entered by following the winking prompts, the calculator can then calculate and display the value of the unknown parameter.

The calculation of fifth or sixth parameters, once a fourth triangular parameter has become known, may proceed either by keyboard request, or automatically, if the calculator is programmed to apply appropriate calculations to the four known parameters.

Programming a calculator with the four selectable algorithms, SSA, SAS, SSS, and AAS makes trigonometric calculations speedier and more efficient than previously known calculators provided with trigonometric functions such as sine, cosine, tangent, and the reverse of these. Such calculators generally required operator knowledge of mathematical relationships and laborious inputs involving several steps. A calculator programmed according to this invention significantly reduces operator labor while speedily producing desired determinations of unknown parameters.

I claim:

1. A trigonometry calculator having a display and comprising:

the calculator being programmed to display operator selectable alternatives of plane triangle calculations each of which determines an unknown parameter from a particular combination of three known parameters;

the calculator being programmed upon selection of one of the triangle calculations to display prompts for input of three known parameters fitting the selected triangle calculation;

the calculator being programmed to calculate an unknown parameter by applying the selected triangle calculation to the thee known parameters input to the calculator;

the calculator being programmed to display the calculated parameter;

the selectable alternatives of plane triangle calculations include a side-side-angle calculation, a side-angle-side calculation, a side-side-side calculation, and an angle-angle-side calculation; and for one of the alternative calculations the calculator is programmed to use the side-side-angle calculation for a triangle having a known angle, a known side opposite the known angle, and a known side adjacent the known angle, for calculating an unknown angle opposite the known side adjacent, the side-side-angle calculation comprising:

applying a reverse sine to a ratio defined by a sine of the known angle multiplied by the side adjacent the known angle and divided by the side opposite the known angle.

2. The trigonometry calculator of claim 1 wherein the displayed selectable alternatives include triangle images illustrating the particular combinations of three known parameters.

3. The trigonometry calculator of claim 1 wherein the calculator is programmed to prompt a predetermined sequence of input of the three known parameters.

4. The trigonometry calculator of claim 1 wherein for one of the alternative calculations the calculator is programmed to use the side-angle-side calculation for a triangle having a known angle and a known side adjacent the known angle and opposite an unknown angle to be calculated, and another known side adjacent the known angle, the side-angle-side calculation comprising:
  applying a negative reverse tangent to a ratio defined by a sine of the known angle multiplied by the side opposite the unknown angle and divided byte cosine of the known angle multiplied by the side opposite the unknown angle minus the other known side adjacent the known angle.

5. A trigonometry calculator having a display and an interface allowing a user to interact with the display, the calculator comprising:
  the calculator being programmed so that an operator using the interface selects a calculation operable to determine an unknown parameter from three specifically known parameters of a particular plane triangle, the selectable calculations including a calculation for side-side-angle and a calculation for angle-angle-side;
  the calculator being programmed upon selection of a calculation to display possible arrangements of the three known parameters;
  the calculator being programmed to prompt interface input of the three known parameters by visually displayed prompts;
  the calculator being programmed to apply the selected calculation to the three input parameters;
  the calculator being programmed to display a determination of the unknown parameter; and
  the calculator is programmed to use the side-side-angle calculation for a triangle having a known angle, a known side opposite the known angle, and a known side adjacent the known angle, for calculating an unknown angle opposite the known side adjacent, the side-side-angle calculation comprising:
  applying a reverse sine to a ratio defined by a sine of the known angle multiplied by the side adjacent the known angle and divided by the side opposite the known angle.

6. The trigonometry calculator of claim 5 wherein the calculator is programmed to determine and display two additional unknown parameters of the triangle after calculating the unknown parameter.

7. The trigonometry calculator of claim 5 wherein the calculator is programmed to use a side-angle-side calculation for a triangle having a known angle and a known side adjacent the known angle and opposite an unknown angle to be calculated, and another known side adjacent the known angle, the side-angle-side calculation comprising:
  applying a negative reverse tangent to a ratio defined by a sine of the known angle multiplied by the side opposite the unknown angle and divided by the cosine of the known angle multiplied by the side opposite the unknown angle minus the other known side adjacent the known angle.

8. A method of operating a calculator to determine an unknown parameter of a plane triangle having three known parameters, the method comprising:
  programming the calculator to offer four calculations corresponding to four different combinations of three known triangle parameters, the four calculations including a calculation for side-side-angle, a calculation for angle-angle-side, a calculation for side-angle-side, and a calculation for side-side-side;
  selecting one of the four calculations to match the three known parameters of a specific plane triangle;
  inputting the three known parameters into the calculator;
  programming the calculator to apply the selected calculation to the input parameters; and
  programming the calculator to display a calculated unknown parameter derived from the three input parameters; and
  the calculator being programmed to use the side-angle-side calculation for a triangle having a known angle and a known side adjacent the known angle and opposite an unknown angle to be calculated, and another known side adjacent the known angle, the side-angle-side calculation comprising:
  applying a negative reverse tangent to a ratio defined by a sine of the known angle multiplied by the side opposite the unknown angle and divided by the cosine of the known angle multiplied by the side opposite the unknown angle minus the other known side adjacent the known angle.

9. A method of operating the calculator of claim 8 including programming the calculator to display triangular images of the four selectable calculations.

10. A method of operating the calculator of claim 8 including programming the calculator to display visible prompts for inputting the three known parameters.

11. A method of operating the calculator of claim 8 including the calculator being programmed to use the side-side-angle calculation for a triangle having a knows, angle, a known side opposite the known angle, and a known side adjacent the known angle, for calculating an unknown angle opposite the known side adjacent, the side-side-angle calculation comprising:
  applying a reverse sine to a ratio defined by a sine of the known angle multiplied by the side adjacent the known angle and divided byte side opposite the known angle.

12. The trigonometry calculator of claim 8 wherein the calculator is programmed to determine and display two additional unknown parameters of the triangle after calculating the unknown parameter.

13. A trigonometry calculator having a display and an interface allowing a user to interact with the display, the calculator comprising:
  the calculator being programmed to make available to an operator four alternatively selectable triangle calculations each of which can determine an unknown parameter from a particular combination of three known parameters;
  the calculator being programmed so tat the interface allows the operator to select one of the triangle calculations suitable to determine an unknown parameter of a triangle having the particular combination of three known parameters;
  the calculator being programmed upon selection of one of the triangle calculations to prompt input of three known parameters fitting the selected triangle calculation;
  the calculator being programmed to calculate an unknown parameter by applying the selected triangle calculation to the three known parameters input to the calculator;
  the calculator being programmed to display the calculator parameter; and
  the selectable triangle calculations comprising:
  a side-side-angle calculation for a triangle having a known angle, a known side opposite the known angle, and a known side adjacent the known angle, for calculating an unknown angle opposite the known side adjacent, the side-side-angle calculation comprising:

applying a reverse sine to a ratio defined by a sine of the known angle multiplied by the side adjacent the known angle and divided by the side opposite the known angle;

a side-angle-side calculation for a triangle having a known angle and a known side adjacent the known angle and opposite an unknown angle to be calculated, and another known side adjacent the known angle, the side-angle-side calculation comprising:

applying a negative reverse tangent to a ratio defined by a sine of the known angle multiplied by the side opposite the unknown angle and divided by the cosine of the known angle multiplied by the side opposite the unknown angle minus the other known side adjacent the known angle;

a side-side-side calculation for a triangle having three known sides for calculating an unknown angle opposite one of the known sides, the side-side-side calculation comprising:

applying a reverse cosine to a ratio defined by a square of a side adjacent the unknown angle plus a square of another side adjacent the unknown angle, minus a square of the side opposite the unknown angle divided by two times the side adjacent the unknown angle times the other side adjacent the unknown angle;

an angle-angle-side calculation for a triangle having a known angle opposite a known side and another known angle opposite an unknown side to be calculated, the angle-angle-side calculation comprising:

multiplying a sine of the angle opposite the unknown side by the known side and dividing by a sine of the angle opposite the known side.

14. The trigonometry calculator of claim 13 wherein the calculator is programmed to determine and display two additional unknown parameters of the triangle after calculating the unknown parameter.

\* \* \* \* \*